June 15, 1926.  
H. B. CLEVELAND  
1,588,526  
PROCESS AND APPARATUS FOR DEWATERING MATERIAL  
Filed Sept. 18, 1922  2 Sheets-Sheet 2
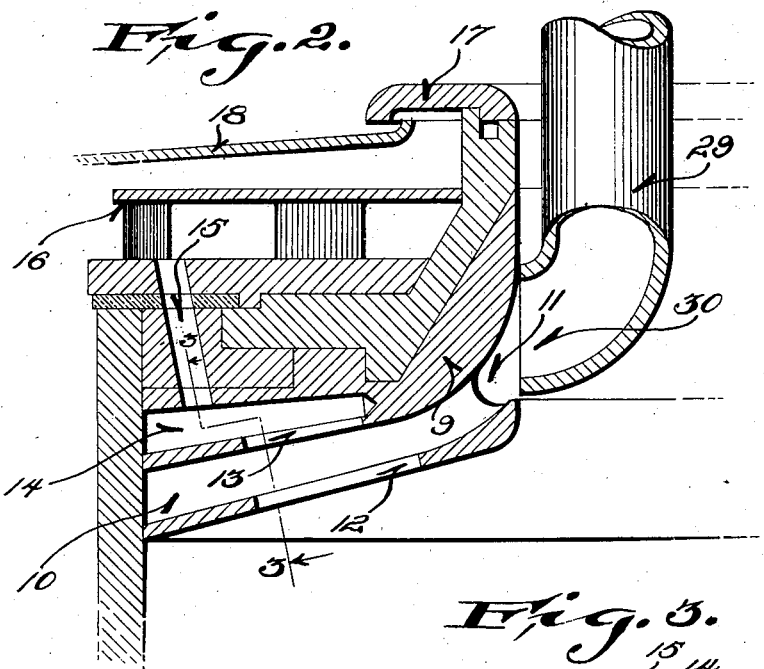
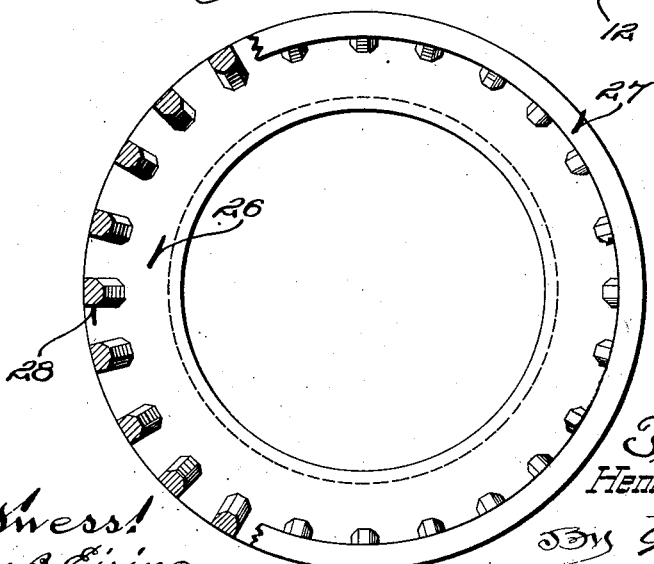

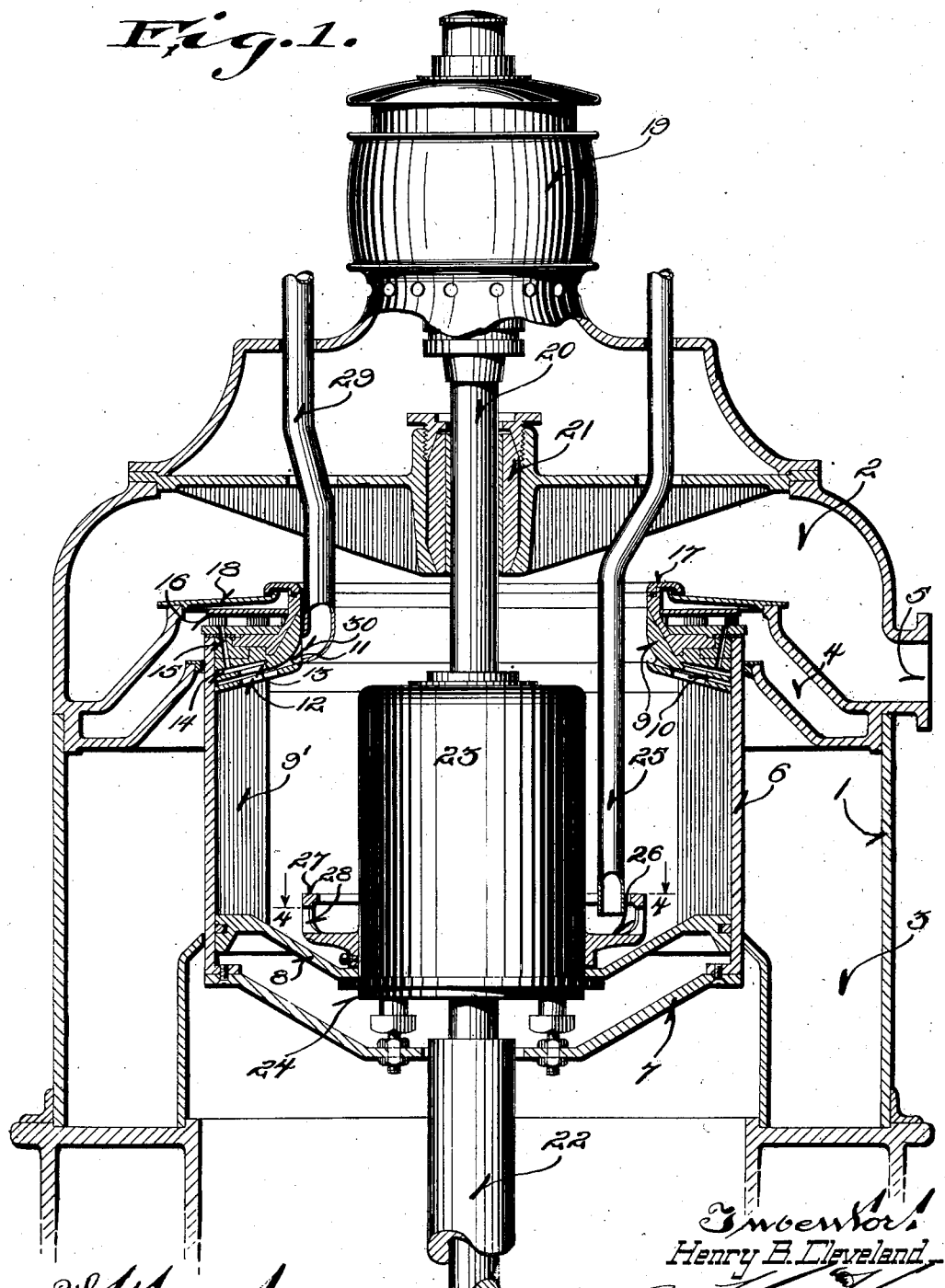

Patented June 15, 1926.

1,588,526

UNITED STATES PATENT OFFICE.

HENRY B. CLEVELAND, OF MILWAUKEE, WISCONSIN.

PROCESS AND APPARATUS FOR DEWATERING MATERIAL.

Application filed September 18, 1922. Serial No. 588,899.

This invention relates to a process of dewatering material, and to a machine for carrying out such process.

More particularly, the invention relates to a process and apparatus for dewatering activated sewage sludge and separating practically all, if not all, of the solid material from the water.

In general, this invention is an improvement over my former inventions disclosed in application No. 471,796, filed May 23, 1921, for "dewatering machines," and application No. 506,368, filed Oct. 8th, 1921, and has in general the same objects as those disclosed in such application.

In centrifuges as heretofore constructed, it has been the practice to provide either a solid wall or a perforate wall, for the centrifuge against which the solid material is held by centrifugal force, the liquid either passing out of the machine by flowing past the ends of the rotating drum, or passing outwardly by flowing thru the cake of material formed on the drum and thru the perforations in the wall. Machines depending solely upon these effects are not wholly satisfactory, as, in the first instance, the cake remains somewhat moist, and in the second instance, the perforated wall soon becomes clogged by the adhering cake.

It is to overcome the above noted difficulties and to retain the advantages of both of these types of machines that the present invention is designed, and it is therefore a primary object of this invention to provide a process and an apparatus for separating the solid material from the liquid, and for extracting the liquid from the cake to thereby effect a more perfect separation than has heretofore been possible.

A further primary object of this invention is therefore to provide a dewatering apparatus in which a clean filtering medium is employed for each run.

More specific objects are to provide a process of dewatering material, in which a filtering operation and the usual centrifugal action take place simultaneously, in which clean filtering medium is employed for each run, and in which such filtering medium may be discharged with the dewatered material at the end of each run.

Further objects are to provide a process by which a layer of filtering material is first positioned, a cake formed, and the liquid discharged centrifugally and also thru such filtering layer, thereby retaining the minute particles of solid matter sustained in the liquid which might otherwise be discharged with the outwardly flowing liquid.

Further objects are to provide a dewatering machine in which new filtering material is used for each run; to provide means for automatically positioning such filtering material, and for automatically discharging it at the end of each run; and to provide a machine in which the filtering material is so positioned that it encounters the clearest liquid, thereby avoiding the necessity of passing the entire liquid bodily thru the cake and insuring maximum rate of flow through the filtering material or medium.

Further objects are to provide a machine for dewatering material, in which protection is afforded against clogging at the filtering portion, in which provision is made for the formation of a cake without danger of the washing of the material outwardly by the discharging liquid; to provide for the free outward flow of the liquid; and to provide a machine in which both the extracted cake and the filtering material may be automatically discharged while the machine is in operation.

Further objects are to provide a machine in which not all of the liquid is forced thru the filtering material, in which the filtering and the main separation occur simultaneously, and in which the sludge, or other entering material, is given substantially the maximum speed of rotation at the beginning of its travel thru the rotating drum.

An embodiment of the invention is shown in the accompanying drawings, in which—

Figure 1 is a vertical sectional elevation of the centrifuge.

Figure 2 is an enlarged detail of the upper portion of the rotating drum.

Figure 3 is a section on the line 3—3 of Figure 2, and

Figure 4 is an enlarged detail, partly in section, of the rotary accelerating means for the incoming sludge.

The machine chosen for illustration, and the process hereinafter detailed, will be described as applied to the dewatering of sewage sludge, but it is to be understood that such process and machine are applicable to other materials and, therefore, the detailed disclosure is to be interpreted as illustrative, rather than limiting, and the invention, therefore, is to be limited only as defined by the appended claims.

In its preferred form, the process contemplated in this invention consists in first providing a layer of filtering material in a centrifugal machine, thereafter admitting sewage sludge and causing such sludge to attain a high rotative speed. The solid material is thrown outwardly and held while the major portion of the liquid passes from the machine and a relatively smaller portion of the liquid passes thru the filtering material, thereby retaining the minute suspended solid matter.

In this process it is contemplated providing the filtering material closely adjacent the cake of solid material so that the filtering process may continue simultaneously with the usual centrifgual separation, and such filtering action may extract the moisture from the substantially solid cake.

This process further contemplates the removal of the filtering material with the removal of the cake, so that a new layer of filtering material is provided for each cycle of operation.

Referring more particularly to the drawings, the machine shown therein and also forming the subject matter of this invention, consists of an outer casing 1 separated into an upper compartment 2, and a lower annular compartment 3, such compartments respectively receiving the outwardly flowing stream of liquid and the dewatered solid material. Between the two compartments a third compartment 4 is provided for receiving the liquid which has passed thru the filtering layer of material. This last compartment may have a separate outlet, or may communicate with the compartment 2 and discharge thru its outlet 5, if desired.

The rotary member comprises an axially movable imperforate drum 6, rigidly attached to a movable bottom 7, and housing the effective bottom 8 of the rotary portion of the apparatus.

The upper portion of the drum comprises an annular composite member 9 joined to the lower portion 8 by a series of uniformly spaced webs 9', and provided with a series of outwardly flaring tapered holes, or passage ways 10. These holes are arranged so that they slant upwardly as they pass inwardly, and are provided with a lower slit 12 communicating with the interior of the drum and with an upper slit 13 of relatively shorter extent than the slit 12. These upper slits 13 communicate with a series of outwardly flaring, or tapered, holes, or passage ways, 14, which are also slightly upwardly slanting as they pass inwardly. The holes 14 are placed in communication with the exterior of the drum, by means of ducts, or passage ways, 15, which open at the upper edge of such drum. The upper opening of these upwardly and outwardly slanting passage ways 15, is positioned beneath a protecting annular disk, or shell, 16, spaced from and carried by the drum. The member 9 carries an upper ring 17, which is slightly spaced from the inner edge of an annular shield 18 carried by the stationary casing. The drum receives its rotary motion from a motor or other suitable means 19, located preferably above and externally of the stationary casing, and directly connected with the drum by means of a drive shaft 20, such shaft being carried in suitable bearings 21 and 22, located above and below the rotary drum.

The means for moving the outer wall 6 of the drum relatively to the remaining portions thereof, may comprise a hydraulic mechanism, one of whose portions 23 may be connected with the main portion of the drum, and the other of whose portions 24 may be connected with the bottom 7, which carries the wall 6, so that when the members 23 and 24 move apart, the outer wall will be drawn downwardly and allow the cake and filtering material to be simultaneously discharged into the annular cavities. The hydraulic means may be controlled in any suitable manner.

In order to impart the maximum speed of rotation to the incoming sludge, which is supplied thru the pipe 25, an annular ring 26 may be rigidly secured to the member 23, and may have a narrower annular ring 27 positioned above it and spaced therefrom, by means of a plurality of upwardly extending arms 28, formed integrally with both annular rings.

The filtering material may be supplied thru the pipe 29 and discharged from its outwardly directed open end 30 into the tapered slanting openings 10, such filtering material being evenly distributed and packed in the openings 10 by centrifugal action.

The operation of the machine is as follows:—The drum is first brought up to speed and suitable filtering material, such as saw dust, is fed down the pipes 29 and discharged into the openings 11 of the holes or passages 10. It is to be noted that the mouth 30 of the pipe is closely spaced from the inner wall of the member 9, and the filtering material is, therefore, prevented from passing to the interior of the drum. The filtering material is evenly distributed and is packed by centrifugal action into the tapered slanting openings 10. After the openings have been sufficiently filled with the compacted filtering material, the sewage sludge is admitted thru the pipe 25 and is quickly brought up to maximum rotative speed by the bottom member composed of the disks 26 and 27, and the spaced supporting portions 28. The sludge discharges radially between the supporting portions 28 and against the outer wall 6 of the drum. The solid larger particles accumulate in the lower portion of the drum and gradually build a cake upwardly corresponding to the surface of an inverted truncated cone. The clear liquid flows over the upper edge of the member 9 and outwardly into the annular cavity 2, discharging thru the outlet 5. It is to be noted that the mass of finely divided suspended solid matter accumulating in the upper portion of the drum, and is prevented from passing outwardly thru the slits 12 by the filtering material held in the openings 10. However, the liquid may pass thru such filtering material, thereby leaving the fine particles retained in the upper portion of the cake. It is to be particularly noted that the moisture contained in the cake may pass outwardly thru the slits 12, and that such cake is, therefore, efficiently dewatered simultaneously with the main centrifugal separation, so that when the run is completed, a very dry cake is secured.

After a sufficient cake has been formed, the incoming sludge is stopped and the hydraulic mechanism operated to lower the outer wall 6 and discharge the dewatered cake into the cavity 3. It is to be particularly noted that when the drum has moved downwardly the packed saw dust, or other filtering material, is discharged from the outwardly flaring openings 10, and any of such filtering material that has collected in the openings 14, is similarly discharged. It will be noted that these openings 10 and 14 flare outwardly and consequently none of the used filtering material will remain in such openings. It is also called to attention that the filtering material that might be positioned within the slits 12 or 13, is also discharged, as such slits slant upwardly and allow the material to be freely thrown into the openings 10 and 14, and thereafter, outwardly from the drum.

While the machine has been described as having the filtering material receiving openings positioned adjacent the upper end of the drum, it may be found desirable to locate them at other portions of the drum, such for example, as the lower portion thereof, and in this connection it is to be understood that various modifications and changes may be made without departing from the spirit of the invention. In this connection it may be stated, for instance, that other filtering medium may be employed and, if desired, retained and cleaned to permit its repeated use.

It is to be understood that if desired, the drum may be rotated for a length of time after the inward flow of sludge has been stopped, to further dry the cake.

It will be seen that a process and apparatus have been provided which will effectively dewater sewage sludge, or similar material, which provides for the automatic discharge of filtering material, and for a new and fresh filtering layer at the beginning of each cycle of operation.

It will also be seen that not all of the liquid is forced thru the cake and thru the filtering material, nor is all of the liquid allowed to flow axially from the drum, but that the liquid is divided into two portions, the clear portion passing axially from the drum, and the portion containing suspended material passing thru the filtering material and thereby being separated from such suspended matter.

I claim:

1. The process of dewatering material, which process comprises positioning a layer of filtering material, forcing material to be dewatered against said filtering material, and causing dewatering to occur by centrifugally separating the clear liquid and simultaneously filtering any resulting cloudy liquid.

2. The process of dewatering material, which process comprises first positioning a layer of filtering material, supplying the material to be dewatered, subjecting both said filtering material and material to be dewatered to the action of centrifugal force, allowing the clear liquid separated by centrifugal action to freely flow away, and causing the liquid carrying suspended matter to pass through said filtering material.

3. The process of dewatering sewage sludge, or similar material, which process comprises forming a compacted layer of filtering material, rotating such material and sludge to cause the solid larger particles to separate from the liquid at a position spaced from said filtering material, and causing the liquid containing the finer particles to pass thru the filtering material.

4. The process of dewatering sewage sludge, or similar material, which process comprises rapidly rotating filtering material to form a compacted mass, rotating said sludge in contact with said filtering material, allowing the clear liquid to freely flow from the rotating sludge, and simultaneously causing the liquid containing finely divided solid matter to pass through said filtering layer.

5. The process of dewatering sewage sludge, or similar material, which process comprises rapidly rotating filtering material to form a compacted mass, rotating said sludge in contact with said filtering material, allowing the clear liquid to freely flow from the rotating sludge, simultaneously causing the liquid containing finely divided solid matter to pass thru said filtering layer, and discharging said filtering material and sludge at the end of each cycle of operations while the filtering material and sludge are being rotated.

6. A dewatering machine comprising a revoluble drum having an open end and having a portion adapted to receive and retain filtering material, said drum having an outwardly opening passage-way communicating with said portion, whereby when said drum is rotated, filtering separation and centrifugal separation occur at separate points.

7. In a machine of the class described the combination of a hollow drum, means for rotating said drum to cause liquid to be separated from solid material by centrifugal action, and filtering means carried by said drum, said drum having means for guiding a portion only of said liquid through said filtering means, the remaining portion of the liquid being discharged without passing through said filtering material.

8. A machine for dewatering sewage sludge or similar material, comprising a revoluble drum having main and auxiliary compartments, said main compartment adapted to hold the cake of dewatered material as it is formed and said auxiliary compartment adapted to hold filtering material and allow liquid to pass therethrough, and means for causing said filtering material to be discharged while the machine is rotated.

9. A machine for dewatering sewage sludge, or similar material, comprising a revoluble drum, means for delivering said sludge into said drum, and means for retaining filtering material within said drum, said drum having an axially movable wall surrounding the main body of the drum and distinct therefrom, whereby when said wall is moved the filtering and dewatered material are discharged by centrifugal force.

10. A machine for dewatering sewage sludge, or similar material, comprising a revoluble drum having a pair of communicating compartments and an axially movable wall closing the outer side of said compartments and surrounding the main body of the drum and distinct therefrom, means for feeding filtering material into one of said compartments, and means for feeding sludge into the other of said compartments.

11. A machine for dewatering sewage sludge, or similar material, comprising a revoluble drum having a main compartment for the reception of said sludge, and an auxiliary outwardly flaring compartment for the reception of filtering material, an axially slidable outer wall closing the outer portion of said compartments, and means for feeding filtering material into said auxiliary compartment, said auxiliary compartment having ducts communicating with said main compartment and with the exterior of said drum, respectively.

12. A machine for dewatering sewage sludge or similar material, comprising a revoluble drum having a main compartment and a series of downwardly and outwardly slanting radial apertures having outwardly flaring walls and having slits communicating with said main compartment and with the exterior of said drum respectively, and an axially movable wall closing the outer sides of said main compartment and said apertures.

13. A machine for dewatering sewage sludge or similar material, comprising a revoluble drum having a main compartment and a series of downwardly and outwardly slanting radial apertures having outwardly flaring walls having slits communicating with said main compartment and with the exterior of said drum respectively, an axially movable wall closing the outer sides of said main compartment and said apertures, and means for feeding filtering material into said apertures.

14. A machine for dewatering sewage sludge, or similar material, comprising a revoluble drum having a main compartment and a series of outwardly flaring apertures communicating with said main compartment and with the exterior of the drum by means of a series of slits, said apertures having open inner and outer ends, a pipe extending into said drum and having a radially opening mouth in juxtaposed relation to the inner ends of said apertures for feeding filtering material into said apertures, means for feeding sludge into said drum, and an axially movable wall covering the outer ends of said apertures and the outer side of the main compartment, whereby upon moving said wall the resulting cake of dewatered material and the used filtering material may be discharged by centrifugal force.

15. A machine of the class described comprising a revoluble drum having an open end and an open central portion, said drum having a filtering medium located adjacent the open end, whereby filtering and centrifugal action simultaneously occur, and whereby filtering takes place adjacent the open end.

In testimony that I claim the foregoing I have hereunto set my hand at Milwaukee, in the county of Milwaukee and State of Wisconsin.

HENRY B. CLEVELAND.